M. Fisk.
Churn Dasher.
№ 94,586.      Patented Sep. 7. 1869.
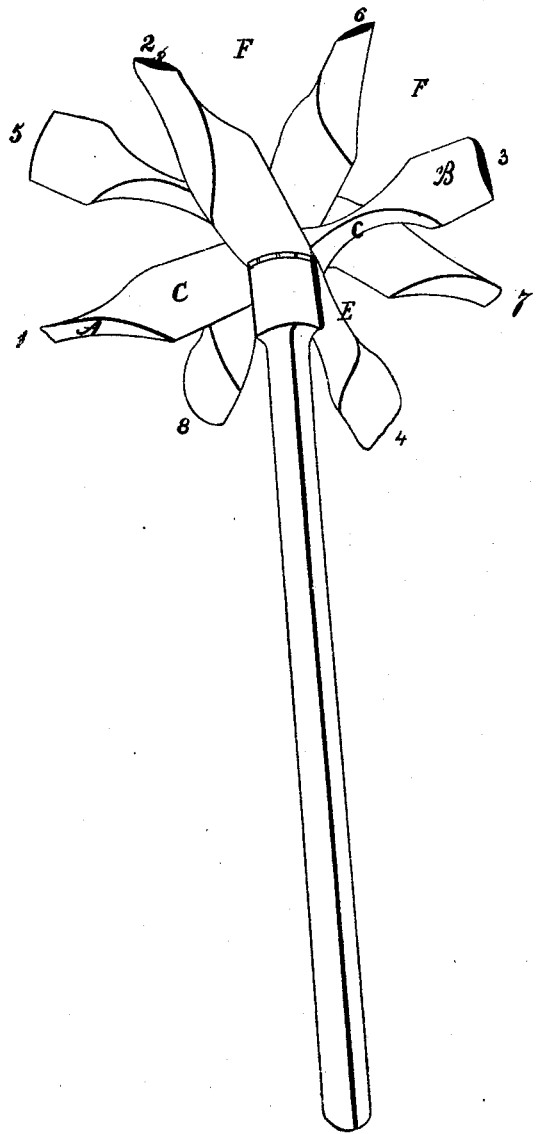
Witnesses
D. H. Stanton
W. D. Brennan
Inventor
Miles Fisk

United States Patent Office.

MILES FISK, OF ADRIAN, MICHIGAN.

Letters Patent No. 94,586, dated September 7, 1869.

IMPROVEMENT IN CHURN-DASHERS.

The Schedule referred to in these Letters Patent and making part of the same.

*To all whom it may concern:*

Be it known that I, MILES FISK, of Adrian, in the county of Lenawee, and State of Michigan, have invented a new and useful Improvement in Churns; and I do hereby declare the following to be a full, clear, and exact description thereof, reference being had to the accompanying drawing, forming part of this specification.

My invention relates to an improvement in churns, and has for its object to produce a dasher which shall, by one simple movement, throw the cream in different directions, the current produced by one set of radial wings being brought in contact with the one next above, and so on successively.

I select four blocks, of suitable material and dimensions, which, when prepared and affixed to the dasher-rod, will form eight radii or wings, arranged about it as a centre.

Each of these blocks is drawn at its end to the form of an acute-angled wedge, but the planes of the wedges on the opposite ends are at right angles to each other, as shown at A and B.

The space C, included between the base of the wedge and the point where it is fastened to the plunger, is recessed and inclined toward the centre, and so as to form another flat surface at a right angle to the plane of the first.

Each flange whose centre is attached to the plunger, thus consists of four separate paddles or strikers, each one at right angles to its alternate, and one pair acting at a greater radial distance from the centre of motion than the other.

All the four pieces, having been shaped in the same manner, they are perforated in the middle, and arranged one above, in close juxtaposition upon the plunger, each adjoining pair of wings enclosing the same angle. They are then firmly retained in place by means of a screw-nut upon the plunger or dasher-rod.

A dasher thus constructed is preferably used with a simple up-and-down movement, but is well adapted, as may readily be seen, for a rotary or vibratory motion. It performs the same functions, by a single movement, that are performed by a double dasher, or one, each of whose parts moves in an opposite direction.

This conflicting action has not hitherto been obtained at all in dashers which have a reciprocating motion, and not in those which rotate, except by a double rotation, which necessitates machinery that is cumbersome in a domestic article, and, moreover, attended with a considerable additional expense.

Having fully described my improved dasher, and the great superiority which it possesses over any now in public use,

What I claim as my invention, and desire to secure by Letters Patent, is—

The improved dasher above described, its radial wings being shaped and arranged with respect to each other in the manner specified.

MILES FISK.

Witnesses:
SAMUEL PARSONS,
HENRY TUTTLE.